United States Patent
Thomas et al.

(10) Patent No.: US 11,459,262 B2
(45) Date of Patent: Oct. 4, 2022

(54) METHOD AND DEVICE FOR HOMOGENIZING GLASS

(71) Applicant: Heraeus Quarzglas GmbH & Co. KG, Hanau (DE)

(72) Inventors: Stephan Thomas, Grosskrotzenburg (DE); Jan Vydra, Hanau (DE); Martin Trommer, Bitterfeld (DE); Michael Huenermann, Alzenau (DE); Andreas Langner, Freigericht (DE); Walter Lehmann, Leipzig (DE); Stefan Hengster, Schaafheim (DE); Klaus Becker, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 354 days.

(21) Appl. No.: 16/662,610

(22) Filed: Oct. 24, 2019

(65) Prior Publication Data
US 2020/0131069 A1 Apr. 30, 2020

(30) Foreign Application Priority Data
Oct. 26, 2018 (EP) .................................... 18202836

(51) Int. Cl.
*C03B 32/00* (2006.01)
*C03B 5/183* (2006.01)
(Continued)

(52) U.S. Cl.
CPC ............. *C03B 5/185* (2013.01); *C03B 5/183* (2013.01); *C03B 32/00* (2013.01);
(Continued)

(58) Field of Classification Search
CPC ...... C03B 5/183; C03B 32/00; C03C 2203/52
See application file for complete search history.

(56) References Cited

U.S. PATENT DOCUMENTS 2,904,713 A 9/1959 Heraeus et al.
3,485,613 A 12/1969 Herczog et al.
(Continued)

FOREIGN PATENT DOCUMENTS

DE 102005044947 3/2007
EP 0909742 4/1999

OTHER PUBLICATIONS

DE 102005044947 A1 (Ganz) Mar. 22, 2007 (English language machine translation), [online] [retrieved Mar. 9, 2022], Retrieved from: Espacenet. (Year: 2007).*
(Continued)

*Primary Examiner* — Erin Snelting
(74) *Attorney, Agent, or Firm* — Dicke, Billig & Czaja, PLLC

(57) ABSTRACT

A known method for homogenizing glass includes the following steps: providing a cylindrical blank composed of the glass, having a cylindrical outer surface which extends between a first end face and a second end face, forming a shear zone in the blank by softening a longitudinal section of the blank and subjecting it to a thermal-mechanical intermixing treatment, and moving the shear zone along the longitudinal axis of the blank. To reduce the risk of cracks and fractures during homogenizing, it is proposed that a thermal radiation dissipator is used that at least partially surrounds the shear zone, the lateral dimension of which in the direction of the longitudinal axis of the blank is greater than the shear zone and smaller than the length of the blank, the thermal radiation dissipator being moved synchronously with the shear zone along the longitudinal axis of the blank.

5 Claims, 1 Drawing Sheet

(51) Int. Cl.
  *C03B 20/00* (2006.01)
  *C03B 5/185* (2006.01)
  *C03B 19/14* (2006.01)

(52) U.S. Cl.
  CPC ...... *C03B 19/1453* (2013.01); *C03B 19/1469* (2013.01); *C03B 20/00* (2013.01); *C03B 2201/42* (2013.01); *C03B 2207/20* (2013.01); *C03C 2203/52* (2013.01)

(56) References Cited

U.S. PATENT DOCUMENTS

| | | | |
|---|---|---|---|
| 3,607,205 | A | 9/1971 | Latham et al. |
| 5,443,607 | A * | 8/1995 | Englisch ............... C03B 32/00 65/102 |
| 5,790,315 | A | 8/1998 | Fujinoki et al. |
| 6,094,941 | A * | 8/2000 | Fujinoki ............ C03B 19/1453 65/424 |
| 7,637,125 | B2 | 12/2009 | Nakanishi et al. |
| 9,278,881 | B2 | 3/2016 | Maida et al. |
| 10,538,455 | B2 | 1/2020 | Edmundson |
| 2003/0126889 | A1 * | 7/2003 | Otsuka ............... C03B 19/1415 65/416 |
| 2003/0228119 | A1 * | 12/2003 | Oshima ................. C03B 32/00 385/123 |
| 2005/0144983 | A1 * | 7/2005 | Nakanishi ......... C03B 37/01242 65/276 |
| 2006/0117798 | A1 | 6/2006 | Hirano |
| 2010/0132407 | A1 | 6/2010 | Ganz et al. |
| 2014/0206524 | A1 * | 7/2014 | Maida ................. C03B 19/1469 65/120 |
| 2017/0369359 | A1 | 12/2017 | Baierl |
| 2020/0131071 | A1 | 4/2020 | Thomas |

OTHER PUBLICATIONS

Heraeus. "OM 100". Jul. 2019. [online] [retrieved Mar. 10, 2022], Retrieved from the Internet: <URL: https://www.heraeus.com/media/media/hca/doc_hca/products_and_solutions_8/solids/OM100_EN.pdf>. (Year: 2019).*
Supplemental Notice of Allowance dated Jun. 23, 2022 in U.S. Appl. No. 16/662,667.
Non-Final Office Action dated Aug. 12, 2021 in U.S. Appl. No. 16/662,667.
Non-Final Office Action dated Oct. 8, 2021 in U.S. Appl. No. 16/662,667.
Final Office Action dated Mar. 24, 2022 in U.S. Appl. No. 16/662,667.
Notice of Allowance dated Jun. 8, 2022 in U.S. Appl. No. 16/662,667.

* cited by examiner

METHOD AND DEVICE FOR HOMOGENIZING GLASS

CROSS-REFERENCE TO RELATED APPLICATIONS

This Utility Patent Application claims priority to European Application No. 18 202 836.5 filed on Oct. 26, 2018, which is incorporated herein by reference. This Utility Patent Application is related to co-pending U.S. Ser. No. 16/662,667, entitled "METHOD FOR HOMOGENIZING GLASS" filed Oct. 24, 2019.

TECHNICAL FIELD

One aspect relates to a method for homogenizing glass by providing a cylindrical blank composed of the glass having a cylindrical outer surface which extends along a longitudinal axis of the blank over a length of the blank between a first end face and a second end face, forming a shear zone in the blank by softening a longitudinal section of the blank and subjecting it to a thermal-mechanical intermixing treatment, and moving the shear zone along the longitudinal axis of the blank.

BACKGROUND

A zone melting method of this type is known from U.S. Pat. No. 3,485,613 A. The solid glass cylinder or the glass cylinder filled with a powder mixture, which is clamped in a glass lathe, is locally heated and is twisted zonally. As the heat source, single- or multi-flame burners or electric heat sources are employed. The dimension of the shear zone in the direction of the axis of rotation (=width of the shear zone) depends on the viscosity. For viscosities of less than about $10^{13}$ Poise (dPa·s), it is adjusted to a value in the range of between 0.1 and 3 times the rod diameter, and for viscosities of less than about $10^5$ Poise (dPa·s) to a value in the range of between 0.1 and 1 times the rod diameter. It can be narrowed by laterally acting cooling means.

It is impossible to achieve homogenization in the direction of the axis of rotation by a simple zone melting method. To homogenize a quartz glass composition in three directions extending perpendicular to each other, a multi-step zone melting method is proposed in EP 673 888 B1 in which a ball-like quartz glass body is produced as an intermediate product by compressing a twisted rod, at both ends of which support rods are placed, which extend transversely to a previous axis of rotation and by means of which the ball-like quartz glass body is elongated and subjected to a further zone melting method with a different axis of rotation. During twisting, one support rod rotates at e.g. 20 to 100 revolutions per minute and the other support rod rotates in the opposite direction at 1 to 3 times this speed. Oxyhydrogen or propane gas burners or electric heating elements are employed as the heat source.

EP 2 757 078 A1 describes the homogenizing of a cylinder composed of titanium-doped glass by forming a shear zone in a cylindrical blank and moving the shear zone along the longitudinal axis of the blank.

DE 10 2005 044 947 A1 describes a method of welding two quartz glass cylinders within a muffle tube composed of opaque quartz glass. Its inner surface is lined with an inner layer of pre-cleaned quartz sand. Furthermore, the inner surface is protected from heating burners by an insertion part made of quartz glass in the shape of a half shell. The inner diameter of the muffle tube is 400 mm, and the outer diameter of the quartz glass hollow cylinder to be bonded is 180 mm. It is mentioned that during production of the muffle tube a thin, transparent surface layer forms, but this does not have a negative impact on the thermally insulating effect of the otherwise opaque quartz glass wall.

From EP 1 533 283 A2, the zonal heating of a glass tube using an axially displaceable furnace is known.

In particular at a high forming speed, i.e. the speed at which the shear zone is moved along the longitudinal axis of the blank, cracking or rod fracture is observed in twisted rods.

One aspect is therefore based on the problem of specifying a modified zone melting method for glass, in particular for glass with a high $SiO_2$ content and particularly for quartz glass, in which the risk of cracks and fractures is reduced.

In addition, one embodiment is based on the problem of providing a device for carrying out the method.

SUMMARY

One embodiment relates to a method for homogenizing glass, comprising the following steps:
(a) providing a cylindrical blank composed of the glass having a cylindrical outer surface which extends along a longitudinal axis of the blank over a length of the blank between a first end face and a second end face,
(b) forming a shear zone in the blank by softening a longitudinal section of the blank and subjecting it to a thermal-mechanical intermixing treatment, and
(c) moving the shear zone along the longitudinal axis of the blank.

Furthermore one embodiment relates to a device for homogenizing a cylindrical blank composed of glass having a cylindrical outer surface which extends along a longitudinal axis of the blank over a length of the blank between a first end face and a second end face, comprising:
(a) a supporting and rotating means with a first supporting element for the mounting and rotating of the first end face of the blank at a first rotational speed, and a second supporting element for the mounting and rotating of the second end face of the blank at a second rotational speed, wherein the first and second supporting element define a working distance and a working axis of the supporting and rotating means,
(b) a heating means for softening a longitudinal section of the blank, and
(c) a displacement means for generating a relative motion between heating means and blank along the working axis.

Optical components composed of glass installed in high-precision systems are subject to strict requirements in terms of their transparency and homogeneity. Often, however, glass exhibits heterogeneous structures, such as layers and so-called "striae", which are attributable to regions of glass with different compositions or differences in the refractive index.

This is particularly problematic for high-silica glass with a high content of $SiO_2$ of e.g. more than 80 wt. %, and in particular for quartz glass with an $SiO_2$ content of 87 wt. % or more. In this case, even at temperatures close to sublimation the viscosity can still be so high that homogenization in a crucible by stirring or refining is impossible.

To eliminate striae and layers in quartz glass, crucible-free melting methods are known in which a cylindrical starting body is clamped in headstocks of a glass lathe and softened zonally, the headstocks simultaneously rotating at different speeds or in opposite directions around an axis of rotation.

As a result of the different rotation of the starting body on either side of the softening zone, torsion (twisting) occurs there and thus mechanical intermixing in the bulk of the glass. The region of the intermixing is also referred to here as the "shear zone". The shear zone is moved along the starting body and this is shaped and intermixed along its length. Heterogeneous structures (striae and layers) are thus reduced or eliminated. The result of this thermal-mechanical intermixing treatment is a blank composed of at least partially homogenized glass. This type of thermal-mechanical intermixing treatment by tool-free shaping is also referred to below as a "homogenizing process", "zone melting method" or "twisting", and the at least partially homogenized cylindrical blank that is present after the twisting is referred to as a "twisted rod".

BRIEF DESCRIPTION OF DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

The embodiments are described in more detail below with reference to an exemplary embodiment and a drawing. The individual figures illustrate schematic illustrations of the following.

DETAILED DESCRIPTION

Figure 1:
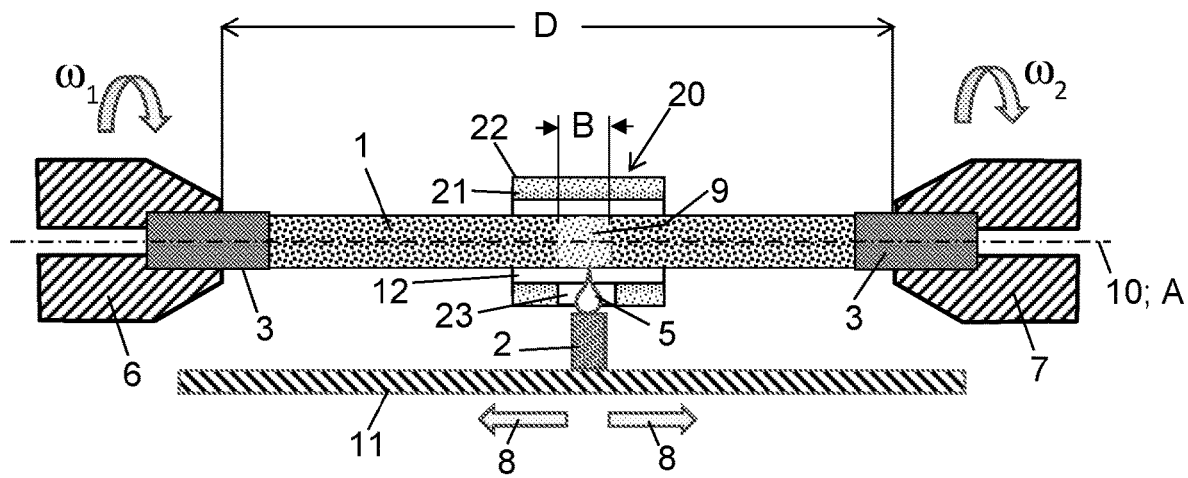
FIG. 1: a zone melting method using a thermal radiation dissipator.

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

In terms of a method according to one embodiment, starting from a method of the type mentioned above, problems are solved by the fact that a thermal radiation dissipator is employed which at least partially surrounds the shear zone, the lateral dimension of which in the direction of the longitudinal axis of the blank is greater than the shear zone and smaller than the length of the blank, the thermal radiation dissipator being moved synchronously with the shear zone along the longitudinal axis of the blank.

The method according to one embodiment is used for the production of glass, in particular of high-silica glass and most particularly of pure or doped quartz glass, which is at least partially homogenized. The cylindrical blank here is subjected to a thermal-mechanical intermixing treatment, the zone melting method. This includes one or more passes (multiple twisting strokes). To this end, the blank—generally extended at both ends by means of fused-on support rods—is clamped into a rotating means, such as a glass lathe, which is equipped with at least one heat source for the local softening of the blank. As a result of different rotational speeds and/or directions of rotation of the blank supports at either end, a shear zone forms in the softened glass, in which torsion and intermixing of the glass take place. By continuously displacing the heating means along the longitudinal axis of the blank and/or by continuously displacing the blank along the heating means, the shear zone is moved through the blank.

The glass has to be heated to high temperatures to form a shear zone; for example, the temperatures necessary for pure quartz glass are above 2000° C. For an effectively intermixing shear zone to be formed, adequate heating of the glass across the entire diameter of the blank is necessary.

On the other hand, glass and in particular quartz glass is a good thermal insulator, which makes it difficult to introduce heat into the bulk of the glass and to generate a homogeneous temperature profile across the diameter of the blank. It is critical that an adequate temperature is achieved in the middle, i.e. in the region of the longitudinal axis of the blank. Sufficient heating in the middle of the blank requires a significantly higher temperature in the peripheral region of the blank, i.e. a large radial temperature difference $\Delta Tr$ between the middle of the blank and the cylindrical outer surface.

One possible explanation of this is that the heat transfer substantially occurs via the cylindrical outer surface of the blank. The heat at the cylindrical outer surface is distributed into the inside of the blank. However, at temperatures of around 2000° C. the heated quartz glass radiates a large quantity of this heat, the radiation occurring from the entire bulk of the glass proportionally to the 4th power of the local temperature according to the Stefan-Boltzmann law. Since, therefore, the heating takes place predominantly by heat conduction via the surface, but the heat loss comes from the entire bulk, a radial temperature gradient $\Delta Tr$ forms.

When the blank is heated without a thermal radiation dissipator, heat is radiated into the cooler surroundings which act as a radiation sink, and so the radial temperature gradient is particularly high. Consequently, there must be a comparatively high heat input from outside in order to reduce the viscosity in the middle of the blank sufficiently.

On the other hand, when a thermal radiation dissipator is used, multiple improvements are obtained.

The thermal radiation dissipator reduces the thermal radiation sink around the shear zone. The radial temperature gradient $\Delta Tr$ is thus reduced. A more even radial temperature distribution causes a more even shear action in the radial direction and facilitates the formation of the shear zone.

The thermal radiation dissipator heats up in the process as it is heated both by any hot burner gases and by the radiated heat (cylindrical outer surface and bulk). This leads in the process to the formation of the thermal radiation dissipator as a radiation source for infrared radiation. Because of the infrared transparency of the blank glass, this infrared radiation also passes inwards and at least partially compensates for the radiation losses from there.

In the presence of hot plasma or heating gases, a further contribution is made by the fact that these hot gases can flow out at both ends of the shear zone in the intermediate space between the blank and the thermal radiation dissipator to the right and left along the blank. This also pre- and/or post-heats the regions next to the shear zone. The preheating can contribute to evening out the radial temperature distribution in the blank, and the post-heating can contribute to reducing thermal stresses resulting from cooling too rapidly.

The thermal radiation dissipator employed in the twisting method according to one embodiment absorbs at least part of the heat energy from the region of the shear zone by heat radiation, heat conduction or heat convection, is itself heated thereby and emits at least part of this energy back to the blank and in particular to the shear zone as longer-wave infrared radiation. Because its lateral dimension is greater than the shear zone, however, heat energy is also transferred to the glass adjacent to the shear zone. As a result of the heating of the regions of the glass bulk bordering the shear zone, i.e. before and after the shear zone, the radial temperature gradient is reduced since, as a result of this preheating, the bulk of the glass that is about to enter the shear zone requires a lower additional heat input from the heat source in order to reach an adequate temperature.

The consequence of this is that the maximum temperature in the peripheral region of the blank and thus also the temperature difference $\Delta Tr$ between the middle and the periphery of the blank is lower than in a shaping process without a thermal radiation dissipator.

Particularly in view of the fact that a narrow shear zone causes more intensive intermixing of the bulk of the glass than a comparatively wider shear zone, the width of the shear zone is in one embodiment less than 0.3 times the diameter of the blank.

In the zone melting method, the rotational speeds $\omega_1$ and $\omega_2$ on either side of the "shear zone" are unequal. The amount of the difference in the rotational speeds at either end is obtained from $\Delta\omega = |\omega_2 - \omega_1|$; in the case of rotation in opposite directions, one of the rotational speeds has a negative sign. Within the shear zone a transition occurs from one rotational speed $\omega_1$ to the other $\omega_2$. In the middle of the shear zone a rotational speed is established which corresponds to the mean value $\overline{v;}^{31}$ between the rotational speeds at either end, $(\overline{v;} = (\omega_2 + \omega_1)/2)$. The "shear zone" here is defined as that part of the bulk of the glass where, for the axial change in the rotational speed $d\omega/dx$, $/d\omega/dx/>0.5 \times |d\omega/dx|_{max}$ applies. The "width of the shear zone" is defined as the longitudinal section in the direction of the longitudinal axis of the blank in which the above condition is fulfilled.

The rotational speeds are determined by measuring the surface speed using optical image processing and evaluating the movement of irregularities close to the surface, such as e.g. bubbles.

Through the fact that the thermal radiation dissipator moves along the longitudinal axis of the blank together with the shear zone, it is ensured that the temperature conditions in the shear zone and the adjacent regions of the bulk of the glass do not vary during the shaping process.

Since the shear zone rotates around an axis of rotation but the thermal radiation dissipator does not (it is fixed in relation to a rotation around the longitudinal axis of the blank), it is sufficient if the thermal radiation dissipator covers a partial circle around the blank. In simple cases, it is designed e.g. as a strip running parallel to the longitudinal axis of the blank and to the cylindrical outer surface or as a half-shell.

With a view to, as far as possible, a complete capture, conversion and utilisation of the heat radiation emitted from the shear zone, however, a design of the thermal radiation dissipator in which it surrounds the cylindrical surface, in one embodiment in the form of a tube, has proved expedient. The tube may optionally be completely or partially open at both ends and it has a closed or largely closed tube wall. Losses of heat energy by radiation or convection are thus avoided. In the simplest case, the inner bore of the tube is cylindrical with a round, oval or polygonal cross-section. It can extend coaxially to the longitudinal axis of the blank and can be e.g. conical, or can have a heterogeneity in the axial direction, such as for instance a change in cross-section. Openings can be present in the tube wall, through which part of the heat can be dissipated or through which an active cooling is possible to allow the heat input to be adjusted with a view to a shear zone that is as narrow as possible. The tube wall is in one piece or is composed of multiple tube sections joined together or of multiple other components.

The heat source here is either located within the tube opening or acts on the shear zone from outside, e.g. through one or more openings in the tube wall or through a longitudinal slit. A longitudinal slit in an otherwise continuous tube wall also has the advantage that mechanical stresses due to the high temperatures and thermal expansion are avoided, which compensates for any disadvantages due to the longitudinal slit in terms of the effect on the temperature homogenization in and around the shear zone.

In a particularly preferred technique, a clearance in the range of 15% to 80% of the diameter of the blank is established between the cylindrical outer surface of the thermal radiation dissipator and the blank.

The gap affects the temperature at the surface of the blank and the temperature distribution. With a comparatively large gap, the radiation intensity impinging on the surface of the blank is lower, but the irradiated surface region is larger because of the wider radiation angle. With a clearance of more than 80% of the diameter of the blank, a comparatively large irradiated area is obtained, which counteracts a narrow shear zone. With a comparatively small clearance of less than 15% of the diameter of the blank, pressure can build up as a result of enclosed gases, which impedes access for a burner or plasma flame.

It has proved particularly expedient if a thermal radiation dissipator is employed having a wall with a reflective inner surface, facing the shear zone, which includes of a glass layer composed of a quartz glass that is transparent to infrared radiation from the NIR wavelength range.

The glass layer in one embodiment does not have any open pores in which foreign materials could settle, so that contamination is prevented from entering the blank during the twisting process. The formation of the glass layer from NIR-transparent quartz glass ensures that the reflectance of the inner surface, and thus its influence on the temperature profile in the region of the shear zone, does not vary in the course of time as a result of vaporised $SiO_2$ if this precipitates on the inner surface as an $SiO_2$ layer (also referred to below as an "$SiO_2$ deposit") and vitrifies as a result of the high temperatures during the twisting process to form quartz glass. For both effects (purity and reflectance), a layer thickness of e.g. 0.1 mm or more is sufficient.

The quartz glass of the glass layer is transparent to infrared radiation from the NIR wavelength range, but part of the radiation impinging on the inner surface is reflected owing to the difference in refractive index between the gas atmosphere and the glass. The reflected portion of the impinging total radiation intensity is generally about 4%. The non-reflected part of the infrared radiation propagates further in the glass layer and a small part of it is scattered or absorbed therein. The transparent quartz glass of the glass layer, with a sample thickness of 10 mm, advantageously transmits at least 50% of the impinging NIR radiation power.

In one embodiment, the radiation component transmitted here impinges on a layer of opaque quartz glass, which diffusely scatters and absorbs infrared radiation.

The opacity of the layer of opaque quartz glass prevents the direct transmission of the infrared radiation in favour of scattering and absorption. On the layer of opaque quartz glass, part of the infrared radiation is in turn reflected. The double reflection on the layer sequence of glass layer and layer of opaque quartz glass means that the non-reflected radiation component is only absorbed within the infrared-radiation-absorbing layer of opaque quartz glass and generates heat there, whereas the hot gas atmosphere around the shear zone only affects the inside facing the blank by heat conduction. The heat input into the thermal radiation dissipator by radiation therefore takes place substantially in the layer of opaque quartz glass and thus at a different point than the heat input by heat conduction. As a result, on the one hand the inside remains hot enough to bind $SiO_2$ deposits on the inside and vitrify them so that they do not fall off, and on the other hand overheating of the inside is avoided.

The opacity of the layer of opaque quartz glass is in one embodiment caused by a porosity of the quartz glass in the range of 2 to 8%.

The thermal radiation dissipator in one embodiment consists completely of quartz glass and particularly in one embodiment of quartz glass that has been produced synthetically from silicon-containing starting substances by pyrolysis or hydrolysis.

In terms of the device, the above-mentioned technical problem is solved according to one embodiment, starting from a device of the type mentioned above, by the fact that the heating means includes a heat source and a thermal radiation dissipator, wherein the thermal radiation dissipator has a lateral dimension in the direction of the working axis which is smaller than the working distance.

The device according to one embodiment is particularly suitable for carrying out the method according to one embodiment explained above. The thermal radiation dissipator employed in this device is, together with the heat source, an important component of the heating means. It absorbs at least part of the heat energy from the region of the shear zone by heat radiation, heat conduction or heat convection, thus being heated itself, and emits at least part of this energy back to the surroundings as longer-wave infrared radiation.

Its lateral dimension in the direction of the working axis is greater than that of the shear zone, so that the heat energy that it emits is also transferred to the bulk of the glass adjacent to the shear zone. As explained above with reference to the method according to one embodiment, the radial temperature difference $\Delta Tr$ between the middle of the blank and the periphery can be kept small as a result.

The thermal radiation dissipator is generally fixed in relation to a rotation around the working axis. It is enough for the thermal radiation dissipator to cover a partial circle around the blank. In simple cases it is designed e.g. as a strip running parallel to the longitudinal axis of the blank and to the cylindrical outer surface or as a half-shell.

With a view to, as far as possible, a complete capture, conversion and utilisation of the heat radiation emitted from the shear zone, however, it, preferably in one embodiment, forms a complete or partial enclosure around the shear zone in the form of a tube. The tube may optionally be completely or partially open at both ends and it has a closed or largely closed tube wall. Losses of heat energy by radiation or convection are thus reduced. In the simplest case, the inner bore of the tube is cylindrical with a round, oval or polygonal cross-section. It can extend coaxially to the longitudinal axis of the blank and can be e.g. conical or can have a heterogeneity in the region of the shear zone, such as for instance a change in cross-section. Openings can be present in the tube wall, through which part of the heat can be dissipated or through which an active cooling is possible to allow the heat input to be adjusted with a view to a shear zone that is as narrow as possible. The tube wall is in one piece or is composed of multiple tube sections joined together or of multiple other components. The heat source here is either located within the tube opening or acts on the shear zone from outside, e.g. through one or more openings in the tube wall or through a longitudinal slit. A longitudinal slit in an otherwise continuous tube wall also has the advantage that mechanical stresses due to the high temperatures and thermal expansion are avoided, which compensates for any disadvantages due to the longitudinal slit in terms of the effect on the temperature homogenization in and around the shear zone.

The thermal radiation dissipator has a dimension in the direction of the working axis that is smaller than the working distance defined by the blank supports at both ends. Its dimension in this direction is thus also shorter than the length of the blank that is clamped in the supports. It can be moved synchronously with the heat source along the working axis.

Advantageous embodiments of the device can be taken from the dependent claims. Where embodiments of the device stated in the dependent claims are modelled on the techniques mentioned in dependent claims relating to the method according to the embodiments, reference should be made to the above statements relating to the corresponding method claims for supplementary explanation.

Definitions and Measuring Methods

Individual steps and terms in the above description as well as measuring methods are additionally defined below. The definitions are part of the description of the embodiments. If there is a material contradiction between one of the following definitions and the rest of the description, the statements in the description are definitive.

Quartz Glass—High-Silica Glass

Quartz glass here means glass with an $SiO_2$ content of at least 87 wt. %. It is undoped ($SiO_2$ content=100%) or it contains dopants, such as e.g. fluorine, chlorine or oxides of rare earth metals, aluminium or titanium. A high-silica glass means a glass with an $SiO_2$ content of at least 80 wt. %.

Porosity—Measuring the Pore Volume

The "pore volume" of a porous material refers to the free volume within the material occupied by voids. The pore volume is measured using e.g. a porosimeter, where a non-wetting liquid (such as e.g. mercury) is pressed into the pores of a porous material under the action of an external pressure against the opposing surface tension forces. The force needed is inversely proportional to the pore size and therefore, as well as the total pore volume, the pore size distribution of the sample can also be determined. Mercury porosimetry only detects pore sizes above 2 nm (mesopores and macropores). "Micropores" are pores with pore sizes of less than 2 nm. Their contribution to the porosity and to the specific surface area is determined using the V-t method by nitrogen absorption, where a sample is held at different pressures and 77 K. The method is equivalent to the BET method, the pressure range being extended to higher pressures so that surface areas of the non-microporous part of the material are also determined.

Transparency in the NIR Wavelength Range

For the wavelength range of the "near infrared" (abbreviated as NIR), there are different nomenclatures. Within the framework of this application, in accordance with DIN 5031 part 7 (January 1984), it is defined as the spectral range between 780 nm and 3000 nm.

Transparent in the NIR wavelength range refers here to a glass which, with a sample thickness of 10 mm, transmits at least 50% of the impinging NIR radiation power.

Providing a Cylindrical Blank Composed of Doped Quartz Glass

EXAMPLE 1: PRODUCTION BY GAS PRESSURE SINTERING

A cylindrical compact of $SiO_2$ pellets was fused in a gas pressure sintering process to form a component composed of the doped, transparent quartz glass. The gas pressure sintering process was performed in a gas pressure sintering furnace with an evacuable sintering mould composed of graphite with a cylindrical inner space. The mould was first heated to the sintering temperature of 1700° C. while maintaining a negative pressure. Once the sintering temperature was reached, a positive pressure of 15 bar was established in the furnace and the mould was held at this temperature for approx. 30 min. During the subsequent cooling to room temperature, the positive pressure was further maintained until a temperature of 400° C. was reached. The blank obtained was in the form of a quartz glass rod with a diameter of 16 mm and a length of 100 mm.

EXAMPLE 2: PRODUCTION BY VAPOUR DEPOSITION

By outside deposition on a support body using the known OVD method, a soot body made of quartz glass was produced and this was then vitrified in a vacuum furnace. From the vitrified OVD cylinder a ⅙ longitudinal segment was cut and this was rounded on a glass turning machine. A quartz glass blank was obtained with a diameter of 80 mm and a length of 2500 mm.

Zone Melting Method

The blanks according to Examples 1 and 2 were then subjected to a zone melting method (twisting) using a thermal radiation dissipator. This processing operation is illustrated in a diagram in FIG. 1 for the blank according to Example 2. For this purpose, two support rods 3 were welded on to the end faces of the blank 1 using a plasma torch. The support rods 3 were clamped in the spindles 6, 7 of a glass lathe. The spindles 6; 7 define a working distance "D", and a working axis "A" of the glass lathe that coincides with the axis of rotation 10 of the blank 1.

The glass lathe was equipped with an oxygen-hydrogen heating burner 2, which produced an oxyhydrogen flame 5.

The heating burner 2 was mounted on a displaceable carriage 11 and was moved thereon, by means of a drive, along the blank 1 which was clamped in the glass lathe (indicated in the Figure by the directional arrows 8), the blank 1 being heated locally to over 2000° C.

As a result of unequal rotational speeds ($\omega 1=(-40)$ rpm; $\omega 2=120$ rpm) and opposite directions of rotation of the two glass lathe spindles 6, 7 a shear zone 9 formed in the heating region of the oxyhydrogen flame 5. In the shear zone 9, an intermixing and thus homogenizing of the glass took place. Its width B approximately corresponded to the impingement area of the oxyhydrogen flame 5 and was e.g. 12 mm. The shear zone 9 was moved along the longitudinal axis of the blank 10 by a reversing motion of the oxygen-hydrogen burner 2, intensively intermixing the rod-shaped blank 1 along its entire length. In this way, a glass cylinder with a diameter of about 79 mm was obtained.

The shear zone 9 here was surrounded by a tubular thermal radiation dissipator 20 composed of quartz glass. This had a length (dimension in the direction of the longitudinal axis of the blank 10) of 300 mm, an inner diameter of 120 mm and a wall thickness of 27 mm; it was likewise mounted on the carriage 11 and was moved synchronously with the heating burner 2, and with the aid of the same drive, along the blank 1 clamped in the glass lathe. The wall of the thermal radiation dissipator 20 had an opening 23, through which the heating burner 2 or oxyhydrogen flame 5 projected. Between the blank 1 and the inner wall of the thermal radiation dissipator 20, an annular gap 12 remained with an average gap width of about 20 mm.

Figure 2:
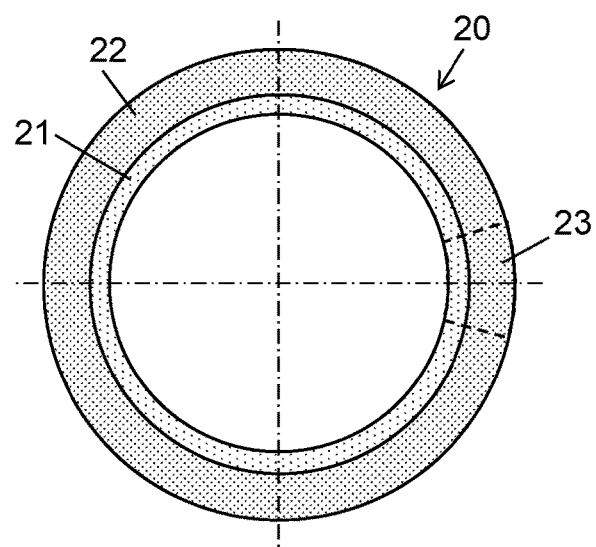
FIG. 2: an enlarged illustration of the tubular thermal radiation dissipator in a view of its end face.

FIG. 2 illustrates a larger illustration of the thermal radiation dissipator 20 of FIG. 1 in a view of its end face. The wall consists of two coaxial and adjacent layers, specifically an inner layer 21 composed of synthetically produced quartz glass with a low bubble content and a layer thickness of 1 mm and of an immediately adjacent outer layer 22 composed of synthetically produced, opaque quartz glass with a layer thickness of 25 mm. The glassy inner layer 21 contains no visually discernible pores. It reflects part of the impinging infrared radiation (about 4% of the total radiation intensity) and is otherwise transparent to infrared radiation over a broad wavelength range. The opacity of the adjacent outer layer 22 is produced by a porosity of about 5%. The infrared radiation impinging on the outer layer 22 is likewise partially reflected at the interface with the inner layer 21, but is predominantly scattered and absorbed in the outer layer 22. Apart from an access opening 23 for the heating burner 2, the wall is closed. The end faces are open.

In the zone melting method according to one embodiment, the thermal radiation dissipator 20 absorbs part of the heat energy from the shear zone 9 in particular by heat radiation and heat conduction, thus being heated itself, and emits this energy as longer-wave infrared radiation. The thermal radiation dissipator 20 is arranged centrally to the shear zone 9 and projects beyond it at both ends, so that the emitted heat energy is also transferred to the bulk of the glass adjacent to the shear zone 9. Compared to a zone melting method without the thermal radiation dissipator 20 the temperature difference $\Delta Tr$ between the middle of the blank and its periphery is reduced by the pre- and post-heating. A contribution to this is made by the fact that the burner gases introduced through the central access opening 23 into the gap 12 between thermal radiation dissipator 20 and blank 1 flow out at both ends of the shear zone 9 to the right and left along the longitudinal axis of the blank 10, thus heating the regions next to the shear zone 9.

This results in an evening out of the temperature profile within the shear zone 9, which not only facilitates the formation of an effectively intermixing shear zone 9, but also reduces the risk of cracking due to mechanical stresses as a result of cooling too rapidly. The shear zone 9 that forms has a width of about 12 mm, i.e. about 13% of the blank's outer diameter. This is a comparatively small width. A narrower shear zone causes more intensive intermixing of the bulk of the glass than a comparatively wider shear zone.

The double reflection at the layer sequence of inner layer 21 and outer layer 22 means that the non-reflected radiation component is only absorbed in the infrared-radiation-absorbing outer layer 22 and generates heat there, whereas the hot gas atmosphere around the shear zone 9 only acts on the tubular inner wall of the thermal radiation dissipator 20 by heat conduction. The heat input into the thermal radiation dissipator 20 by radiation therefore takes place substantially in the outer layer 22 and thus at a different point to the heat input by heat conduction. As a result, on the one hand the inside remains hot enough to bind $SiO_2$ deposits on the inside and vitrify them so that they do not fall off, and on the other hand an overheating of the inside is avoided.

The following table illustrates test parameters and results of zone melting methods with a thermal radiation dissipator (Test 1) and without a thermal radiation dissipator (Test 2).

TABLE 1

| Test | $\omega_1$ [rpm] | $\omega_2$ [rpm] | $T_{max}$ [° C.] | v [mm/min] | B [mm] | Cracks |
|---|---|---|---|---|---|---|
| 1 | −40 | 160 | 2290 | 10 | 10 | No |
| 2 | −40 | 160 | 2235 | 7 | 12 | Yes |

The terms in the table have the following meanings:
$\omega_1$, $\omega_2$: rotational speeds on either side of the "shear zone"
$T_{max}$: maximum temperature in the region of the shear zone
v: translational speed of heating burner and thermal radiation dissipator
B: maximum width of shear zone
Cracks: occurrence of a crack after completion of the zone melting method.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of specific embodiments discussed herein. Therefore, it is intended that these embodiments be limited only by the claims and the equivalents thereof.

The invention claimed is:

1. A method for homogenizing glass, comprising:
  (a) providing a cylindrical blank composed of the glass, having a cylindrical outer surface which extends along a longitudinal axis of the blank over a length of the blank between a first end face and a second end face;
  (b) forming a shear zone in the blank by softening a longitudinal section of the blank and subjecting it to a thermal-mechanical intermixing treatment; and
  (c) moving the shear zone along the longitudinal axis of the blank,
  wherein a thermal radiation dissipator is used that at least partially surrounds the shear zone, the lateral dimension of which in the direction of the longitudinal axis of the blank is greater than the shear zone and smaller than the length of the blank, the thermal radiation dissipator being moved synchronously with the shear zone along the longitudinal axis of the blank, and wherein the thermal radiation dissipator comprises a wall with a glass layer facing the shear zone composed of a quartz glass that is transparent to infrared radiation from the NIR wavelength range of 780 nm and 3000 nm and which, at a sample thickness of 10 mm, transmits at least 50% of the incident NIR radiation.

2. The method according to claim 1, wherein between the thermal radiation dissipator and the cylindrical outer surface of the blank a clearance in the range of 15% to 80% of the diameter of the blank is established.

3. The method according to claim 1, wherein, in addition to the glass layer facing the shear zone, the thermal radiation dissipator comprises a layer composed of opaque quartz glass.

4. The method according to claim 3, wherein the layer composed of opaque quartz glass borders the glass layer facing the shear zone or merges into the glass layer facing the shear zone.

5. The method according to claim 3, wherein the opacity of the layer composed of opaque quartz glass is caused by a porosity of the quartz glass in the range of 2 to 8%.

* * * * *